(12) United States Patent
Palmer et al.

(10) Patent No.: US 11,655,878 B2
(45) Date of Patent: May 23, 2023

(54) POWER TRANSMISSION DRIVE MEMBER

(71) Applicant: NEW MOTION LABS LTD., Exeter (GB)

(72) Inventors: Josh Daniel Palmer, London (GB); Lucas Lobmeyer, Loehnberg (DE); Marcel Fowler, London (GB)

(73) Assignee: NEW MOTION LABS LTD., Exeter (GB)

( * ) Notice: Subject to any disclaimer, the term of this patent is extended or adjusted under 35 U.S.C. 154(b) by 239 days.

(21) Appl. No.: 17/104,420

(22) Filed: Nov. 25, 2020

(65) Prior Publication Data

US 2021/0079979 A1 Mar. 18, 2021

Related U.S. Application Data

(63) Continuation-in-part of application No. 16/629,918, filed as application No. PCT/GB2018/000105 on Jul. 10, 2018, now Pat. No. 11,421,756.

(30) Foreign Application Priority Data

Jul. 13, 2017 (GB) ........................................ 1711342
Sep. 28, 2017 (GB) ........................................ 1715782
Oct. 24, 2017 (GB) ........................................ 1717436

(51) Int. Cl.
*F16G 13/04* (2006.01)
*F16G 13/06* (2006.01)
*F16G 13/08* (2006.01)

(52) U.S. Cl.
CPC ............. *F16G 13/04* (2013.01); *F16G 13/06* (2013.01); *F16G 13/08* (2013.01)

(58) Field of Classification Search
CPC ........... F16G 13/06; F16G 13/04; F16G 13/08
(Continued)

(56) References Cited

U.S. PATENT DOCUMENTS 4,290,762 A 9/1981 Lapeyre
4,378,719 A 4/1983 Burgess
(Continued)

FOREIGN PATENT DOCUMENTS

CN 102537210 7/2012
DE 102014206896 10/2014
(Continued)

OTHER PUBLICATIONS

Intellectual Property Office, Search Report, GB Application No. 1717436.8, dated Jan. 5, 2018.
(Continued)

*Primary Examiner* — Gene O Crawford
*Assistant Examiner* — Emily R Kincaid
(74) *Attorney, Agent, or Firm* — Saliwanchik, Lloyd & Eisenschenk

(57) ABSTRACT

A power transmission drive member adapted to mesh with a drive sprocket to transmit rotary motion, the drive member comprising a plurality of engaging mechanisms, each comprising an engaging body comprising an engagement pocket adapted to engage with the drive sprocket, each of which engagement pockets comprising a first engaging surface and a second engaging surface spaced apart from the first engaging surface, the first and second engaging surfaces forming an engaging surface pair, which pair is rotatable about an engaging mechanism rotational axis, wherein the power transmission drive member comprises a carrier, which carrier is articulated and is adapted to support the plurality of engaging mechanisms.

14 Claims, 20 Drawing Sheets

(58) Field of Classification Search
 USPC .......................................................... 474/213
 See application file for complete search history.

(56) References Cited

U.S. PATENT DOCUMENTS

| | | |
|---|---|---|
| 6,526,740 B1 | 3/2003 | Tanemoto et al. |
| 2004/0185977 A1 | 9/2004 | Young et al. |
| 2008/0176688 A1 | 7/2008 | Sakura et al. |
| 2013/0225345 A1 | 8/2013 | Bodensteiner et al. |
| 2014/0057750 A1 | 2/2014 | Yokoyama |
| 2014/0141913 A1* | 5/2014 | Yokoyama .............. F16G 13/18 474/206 |
| 2016/0348755 A1 | 12/2016 | Ritz et al. |

FOREIGN PATENT DOCUMENTS

| | | |
|---|---|---|
| EP | 0171561 | 2/1986 |
| GB | 2351543 | 1/2001 |
| JP | 3501493 | 3/2004 |

OTHER PUBLICATIONS

International Search Report dated Oct. 24, 2018 for PCT/GB2018/000105.
Chinese Search Report, Chinese Application No. 201880046123.5.

\* cited by examiner

POWER TRANSMISSION DRIVE MEMBER

CROSS-REFERENCE TO RELATED APPLICATIONS

This application is a continuation-in-part (CIP) application of U.S. patent application Ser. No. 16/629,918, filed Jan. 9, 2020, which is a national stage application of International Patent Application No. PCT/GB2018/000105, filed Jul. 10, 2018, which claims priority to Great Britain Application No. 1711342.4, filed Jul. 13, 2017, Great Britain Application No. 1715782.7, filed Sep. 28, 2017, and Great Britain Application No. 1717436.8, filed Oct. 24, 2017, the disclosures of all of which are incorporated herein by reference in their entirety, including any figures, tables, and drawings.

BACKGROUND TO THE INVENTION

This invention relates to a power transmission drive member, and particularly, but not exclusively, to a power transmission drive member for use with a drive sprocket, wherein the power transmission drive member is adapted to engage with the drive sprocket during use in order to transmit rotary motion. The invention also relates to an engaging mechanism forming part of the power transmission drive member, and a power transmission system comprising a power transmission drive member and a drive sprocket.

Known power transmission drive members include power transmission chains or belts which are adapted to engage with the teeth of a drive sprocket or pulley.

For example, roller or bush chains, or hollow pins chains which are a variation of standard roller or bush chains are adapted to transmit rotational motion from one rotating shaft to another by meshing with the teeth of a sprocket attached to each of the shafts.

Standard bush chains comprise inner and outer links, where the inner links comprise two spaced apart inner plates connected by two bushes with press fits between plates and bushes. The outer links comprise two spaced apart outer plates connected by two pins with press fits between plates and pins. In standard roller chains, the bushes of the inner links pass through rollers which are free to rotate around the outer surface of the bushes and are contained within the inner link by the plates of the link. In both hollow pin chains and standard bush and roller chains, the links are connected by means of a pin of an outer link passing through the bush of an adjacent inner link. Adjacent outer and inner links are able to rotate relative to one another about this pin-bush interface whilst simultaneously carrying load. A chain of connected links is able to form a loop and articulate around multiple sprockets, transferring torque and rotary motion between the sprocket axes.

A hollow pin bush chain is similar to a standard bush chain except that the pins of the outer link are hollow. Such a configuration allows for attachments to be readily fitted to the chain, primarily for conveying purposes. Attachments may be fitted by inserting pins through the hollow pins of the chain. Hollow pins also allow the weight of the chain to be reduced whilst maintaining the stiffness of the components.

In known hollow pin bush chains, each tooth of a drive sprocket is received between two adjacent bushes. Each tooth makes contact with one of the two adjacent bushes and transfers load between the chain and the sprocket at this contact interface.

A disadvantage of such known power transmission chains is that power is not transmitted efficiently in many cases. More specifically, known power transmission drive members invariably make contact with drive sprockets under significant loads, and in such situations, the drive members frequently tend to move relative to the teeth of the sprockets whilst maintaining contact under this high loading. The result is that known power transmission members do not work efficiently on drive sprockets.

SUMMARY OF THE INVENTION

According to a first aspect of the present invention there is provided a power transmission drive member adapted to mesh with a drive sprocket to transmit rotary motion, the drive member comprising a plurality of engaging mechanisms, each comprising an engaging body comprising an engagement pocket adapted to engage with the drive sprocket, each of which engagement pockets comprising a first engaging surface and a second engaging surface spaced apart from the first engaging surface, the first and second engaging surfaces forming an engaging surface pair, which pair is rotatable about an engaging mechanism rotational axis, wherein the power transmission drive member comprises a carrier, which carrier is articulated and is adapted to support the plurality of engaging mechanisms.

By means of the present invention, each tooth of the drive sprocket will engage with an engaging body by contacting both the first engaging surface and the second engaging surface during use.

Such an arrangement reduces both the stress on the sprocket during use, and the relative movement between the chain and sprocket when engaged, thereby reducing wear and tear on the drive member as well as the drive sprocket. In addition, frictional losses are reduced thereby increasing transmission efficiency.

Because the carrier is articulated, the engaging bodies supported by the carrier are able to articulate around the drive sprocket during use.

In embodiments of the invention, the first and second engaging surfaces are positioned symmetrically relative to the rotational axis in respect of engaging bodies.

In embodiments of the invention, the engaging surfaces are configured such that when driven, a tooth of the sprocket meshes to the engagement pocket at a first contact location on the first engaging surface, and also at a second contact location on the second engaging surface.

In embodiments of the invention, the first contact location is radially offset from the second contact location during use. This helps to prevent the engagement pocket of the drive member from becoming wedged or stuck on a tooth during use.

In embodiments of the invention, the first and second engaging surfaces are formed on first and second pins respectively.

In some embodiments of the invention the pins are formed integrally with the remainder of the engaging body, whilst in other embodiments the pins are formed separately to the remainder of the engaging body. In such embodiments, the pins may be attached to the remainder of the engaging body by any convenient method and may be attached to the attachment portion by means of a press fit, for example.

In some embodiments of the invention, the first and second pins may be circular in cross-section. In other embodiments of the invention, one or both of the first and second pins may be partially circular in cross-section. For example, one of both of the first and second pins could have a semi-circular cross-sectional shape, and the respective engaging surface would be formed on a part of the pin that has a curved surface.

In embodiments of the invention, each engaging mechanism comprises two engaging bodies, which engaging bodies are spaced apart from one another.

In embodiments of the invention, each engaging mechanism comprises a connecting member having a first end and an opposite second end, and attachable to one engaging body at the first end, to the other engaging body at the second end, and extending colinearly with the rotational axis of the respective engaging mechanism wherein each engaging body of a respective engaging mechanism comprises a front face and an opposite back face, wherein the engaging surfaces of each engaging body extend from the front face of a respective engaging body, and the connecting member extends from the back face of each engaging body, which connecting member is adapted to enable connection of a respective engaging mechanism to the carrier.

Because the connecting member extends between the back faces of each engaging body, the connecting member may extend into the carrier in order to secure each engaging body to an opposite side of the carrier, with the engaging surfaces of each engaging body extending outwardly, away from the carrier.

In embodiments of the invention, the connecting member is attached to a respective engaging body by means of a press fit with the engaging body.

This means that each engaging body will rotate with the connecting member. The engaging bodies cannot rotate independently of rotation of the connecting member.

This can be advantageous, since each engaging member of an engaging mechanism will rotate with the other engaging body forming the respective engaging mechanism.

In other embodiments of the invention, the connecting member may be attached to a respective engaging body by means of a clearance fit.

In such embodiments of the invention, the engaging body is free to rotate independently about the connecting member.

This can be advantageous in embodiments of the invention where the carrier is, for example, a bush chain. Such chains do not comprise hollow pins.

In embodiments of the invention comprising a connecting member, the connecting member may extend transversely through the carrier whereby a first engaging body may be positioned on a first side of the carrier and a second engaging body may be positioned on a second, opposite side of the carrier.

In such embodiments of the invention, the engaging bodies may thus face outwardly from the carrier, with each engaging mechanism having a first engaging body on one side of the carrier, a second engaging body on an opposite side of the carrier, such that engagement with the teeth of a drive sprocket takes place externally to the carrier.

This is in contrast to known power transmission drive members such as bush chains where the chain engages with the teeth of a sprocket within the structure of the chain.

In addition, because the connecting member is coaxial with the engaging mechanism rotational axis, each engaging body of an engaging mechanism is rotatable about the axis of the connecting member, and thus both engaging bodies rotate about the same axis.

The connecting member may take any convenient form, and may for example, comprise a pin.

In such embodiments of the invention, therefore, the connecting member may be regarded as a central pin of the respective engaging mechanism.

Each engaging body may comprise a receiving portion adapted to receive the connecting member, which receiving portion comprises an aperture, the centre of which is coaxial with the rotational axis of a respective engaging mechanism.

By means of the aperture formed in each engaging body, it is possible to attach, or connect another component to the engaging body, whilst allowing rotation of the engaging body about the rotational axis.

In embodiments of the invention, the carrier comprises hollow pins extending transversely at least partially across the carrier at spaced apart intervals along the length of the carrier, wherein each connecting member extends through a hollow pin to thereby connect the engaging mechanisms to the carrier.

In such embodiments of the invention, an engaging body may be fitted to each end of a connecting member so that one engaging body is on one side of the carrier, and the other engaging body is on the opposite side of the carrier, and both engaging bodies are external to the carrier with the engaging surfaces extending away from the carrier.

In such embodiments of the invention, the carrier may comprise a hollow pin bush chain.

In such embodiments of the invention, the connecting member may be attached to each engagement body press fit. This means that the engagement bodies will rotate with the connecting member.

In other embodiments of the invention, the carrier may take different form and may not be a hollow pin bush chain. For example, the carrier could be a standard bush chain rather than a hollow pin bush chain.

In such embodiments of the invention, the carrier comprises pins extending transversely at least partially across the carrier at spaced apart intervals along the length of the carrier, wherein each connecting member comprises a pin extending across the carrier between the engaging bodies of a respective engaging mechanism and through the aperture of each engaging body, wherein the pin is shaped to form an interference fit with the link plates of the bush chain, and a clearance fit with the apertures of each engaging body.

In such embodiments of the invention, the engaging bodies are rotatable about the axis of a respective pin independently of the bush.

An advantage of the present invention is therefore, that a standard chain, such as a hollow pin bush chain may be adapted so that it engages with either two sprockets, or a single sprocket with two sets of teeth, whereby the teeth of the sprocket or sprockets mesh with engagement pockets positioned externally to the chain.

In embodiments of the invention, the planes of symmetry of both engaging bodies may be parallel to one another, such that the engaging surfaces of each engaging body are aligned with one another.

In such embodiments of the invention, the power transmission drive member may be adapted to mesh with two drive sprockets, which drive sprockets are spaced apart from one another such that the teeth of a first drive sprocket engage with the engaging bodies on a first side of the carrier, and the teeth of a second drive sprocket engage with the engaging bodies on the second, opposite side of the carrier.

In such embodiments of the invention, the carrier and the engaging mechanisms are adapted to articulate around the drive sprockets making contact via the engaging mechanisms. The two sprockets are positioned on either side of the carrier, with the teeth of one drive sprocket engaging with the engaging bodies on a first side of the carrier, and the teeth of a second sprocket engaging with the engaging bodies on a second, opposite side of the carrier.

In some embodiments of the invention, the power transmission drive member comprises a single drive sprocket, which drive sprocket comprises two sets of teeth, which sets of teeth are spaced apart from one another.

In such embodiments of the invention, the carrier and the engaging mechanisms may be adapted to articulate around the drive sprocket making contact via the engaging mechanisms. The two sets of teeth are positioned on either side of the carrier, with the first set of teeth engaging with the engaging bodies on a first side of the carrier, and the second set of teeth engaging with the engaging bodies on a second, opposite side of the carrier.

As mentioned above, in some embodiments of the invention, the carrier may comprise a standard hollow pin bush chain or a standard bush chain with solid pins. Such chains come in several predetermined sizes based on specific applications and international standards. The dimensions of these known chains are dependent on the sprocket with which a particular known chain is designed to engage. Key dimensions are the bush diameter and the inner width of the chain. The inner width of the chain is the distance between the inner surfaces of the two inner plates forming an inner link in the chain.

Because the teeth of the drive sprocket, or drive sprockets engage with the engaging bodies externally to the chain, by means of the invention, there is no longer a need for the chain to interact with a sprocket tooth by conventional contact with a bush. This means that the width of the chain may be greatly reduced to the point that a sprocket tooth would not be able to fit within the remaining space.

Furthermore, the space in which a conventional roller chain tooth typically sits can be completely removed such that the inner link of the chain can be reduced to a single plate. Such a design reduces the number of components to the chain and allows the width of the chain to be drastically reduced, thereby reducing the width of the required sprocket and thus the entire system.

In some embodiments of the invention the inner link may be thicker than the outer link.

In other embodiments of the invention, the inner link of the chain may comprise a composite inner link formed from a plurality of thinner link plates. An advantage of such an embodiment is that by manufacturing thinner link plates, it is possible to readily manufacture a composite link having a desired thickness by combining an appropriate number of the thinner link plates.

In embodiments of the invention, each engaging mechanism comprises first and second extension members which extension members are spaced apart from, and coaxial with one another, and each have first and second end portions, wherein the extension members extend across the width of the engaging mechanism and through each engaging body such that the first and second end portions of each extension member extend from the first face of each engaging body, away from the carrier to form a pin, wherein the first engaging surfaces of each engaging body are formed on the first and second end portions respectively of the first extension member, and the second engaging surfaces of each engaging body are formed on the first and second end portions respectively of the second extension member.

In such embodiments of the invention, the first and second extension members serve to connect the two engaging bodies to one another; thus, parts of the engaging mechanism are integrally formed.

In such embodiments of the invention the power transmission drive member may be a chain formed from links, comprising a body portion and first and second legs extending from the body portion to define a space between the legs and the body portion, wherein each leg comprises a hollow pin receiving portion, wherein the hollow pin receiving portion of a first leg of a link is coaxial with the rotational axis of a first engaging mechanism, and the hollow pin receiving portion of the second leg of the link is coaxial with the rotational axis of a second, adjacent, engaging mechanism, and wherein each connecting member is adapted to extend through a respective hollow pin and engaging body, to thereby link the engaging bodies to the links, such that each engaging body is rotatable about its rotational axis, the space of each link providing space for such rotation.

In embodiments of the invention comprising an aperture, the hollow pin receiving portion of the first leg of a link will be coaxial with the aperture of a first engaging body, and the hollow pin receiving portion of the second leg of a link will be coaxial with the aperture of a second, adjacent engaging body, and the hollow pins will extend through the apertures of the engaging bodies.

By means of the present invention, when the chain is in tension, there is little, or no force transmitted to the central pin of the engaging mechanism. This means that the central pin is free to rotate about its axis regardless of the loading condition of the chain. This increases the efficiency of power transmission since during engagement, as the engaging mechanism rotates upon making contact with the tooth, it does so without significant load at its contact interface with the interior surface of the hollow pin chain or pin link, thereby greatly reducing the frictional losses.

On the other hand, it is possible that when travelling between sprockets, because the engaging mechanisms are essentially free to rotate without any resistance, they may adopt an undesirable orientation with respect to the teeth of the sprockets with which they are to engage. In other words, a position in which the orientation of the engaging body may cause it to get stuck on top of a tooth rather than adopting the correct position with engaging surfaces either side of the tooth may occur. If this situation arises, then it can either rectify itself by snapping into position when the chain tension increases sufficiently to pull it into position, causing undesirable vibrations and wear, or it may remain stuck in the incorrect position and disrupt the engagement of the following engaging mechanisms, thereby increasing the tension of the system and potentially causing the whole system to fail.

In embodiments of the invention, therefore the carrier comprises angle of rotation limiters adapted to limit the rotation of the engaging mechanisms.

The angle of rotation limiters may comprise stops formed on the carrier, such as folded portions, punched portions, and punched and folded portions. Such portions provide physical stops to the rotational movement of the engaging mechanisms.

In embodiments of the invention, the angle of rotation limiters may be formed on the links of a chain forming the carrier.

In each of the embodiments described above, each engagement body comprises an engagement pocket adapted to engage with the drive sprocket, each of which engagement pockets comprising a first engaging surface and a second engaging surface spaced apart from the first engaging surface, the first and second engaging surfaces forming an engaging surface pair, which pair is rotatable about an engaging mechanism rotational axis, wherein the power transmission drive member comprises a carrier, which carrier is articulated and adapted to support the plurality of engaging bodies.

By means of present invention, each tooth of the drive sprocket will engage with an engaging body by contacting both the first engaging surface and the second engaging surface during use.

The engaging mechanisms forming part of the present invention are thus dual engaging mechanisms ensuring dual engagement of the teeth of a sprocket engaged with a power transmission drive member according to the first aspect of the invention.

According to a second aspect of the invention there is provided an engaging mechanism forming part of a power transmission drive member according to the first aspect of the invention.

According to a third aspect of the invention, there is provided a power transmission system comprising a power transmission drive member according to the first aspect of the invention, and a drive sprocket, wherein the power transmission drive member is adapted to mesh with the drive sprocket to transmit rotary motion.

BRIEF DESCRIPTION OF THE DRAWINGS

The invention will now be further described with reference to the accompanying drawings in which.

DETAILED DESCRIPTION

Figure 1:
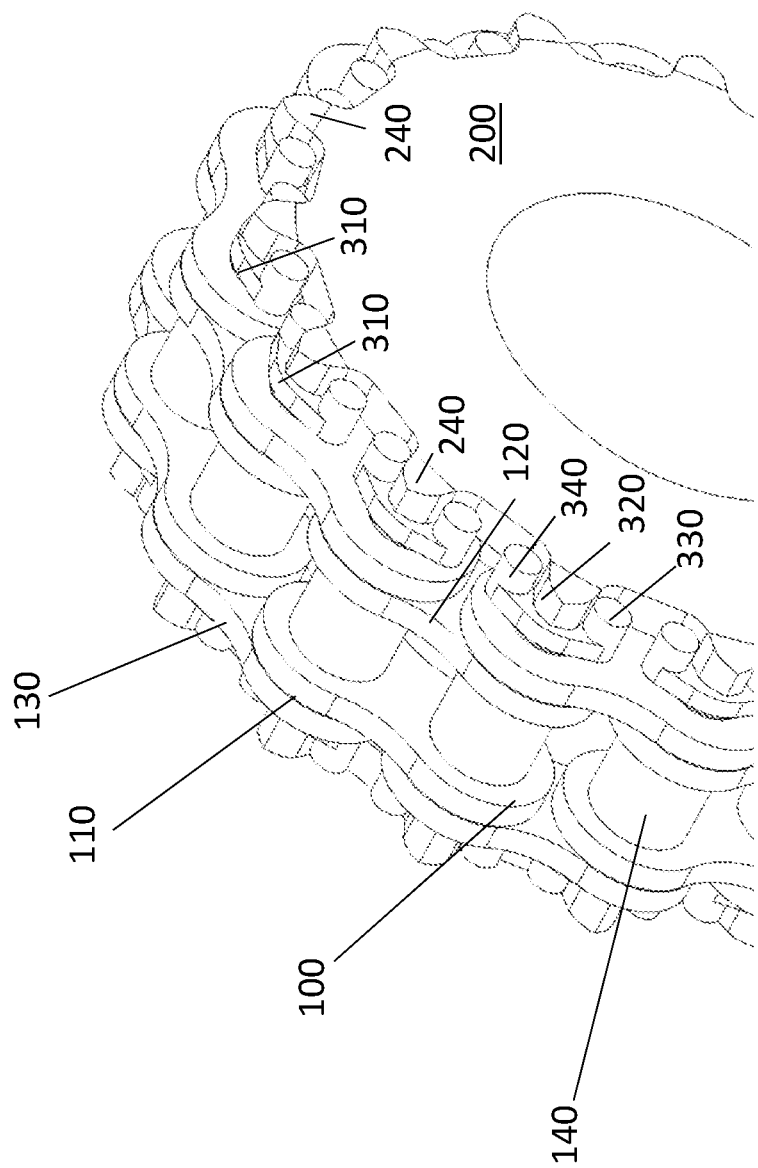
FIG. 1 is a power transmission drive member according to an embodiment of the invention in which the carrier comprises a hollow pin chain with a plurality of engaging bodies articulated around a drive sprocket.

Referring to FIGS. 1 to 7, and initially to FIG. 1, a power transmission drive member according to an embodiment of the invention is designated generally by the reference numeral 100. The drive member 100 is shown articulating around a drive sprocket 200, shown in more detail in FIG. 7. As can be seen, particularly from FIG. 7, sprocket 200 comprises a first set of teeth 210 and a second set of teeth 220. The sets of teeth 210, 220 are spaced apart from one another by the sprocket body 230. In other embodiments of the invention, the drive sprocket 200 may be replaced by two separate sprockets each having a single set of teeth and spaced apart from one another so that the teeth of both sprockets engage with the drive member.

Figure 2:
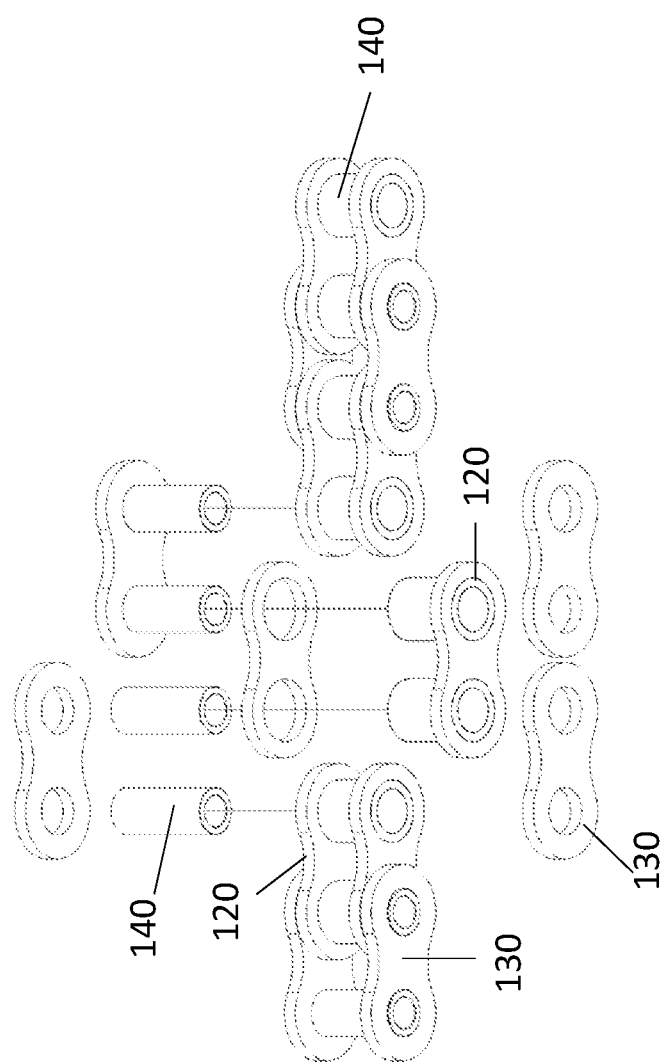
FIG. 2 is an exploded view of a portion of the hollow pin chain of FIG. 1 showing the links of the chain.
Figure 3:
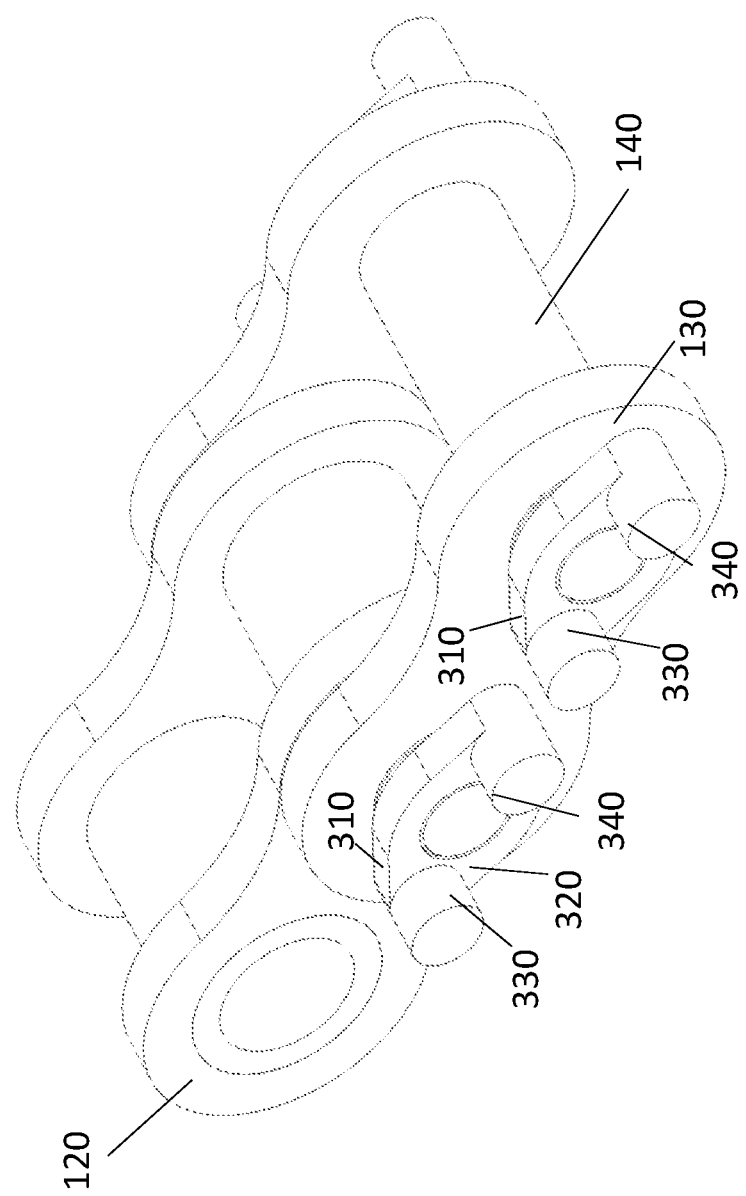
FIG. 3 is a detailed representation of links of the hollow pin chain of FIG. 1.
Figure 4:
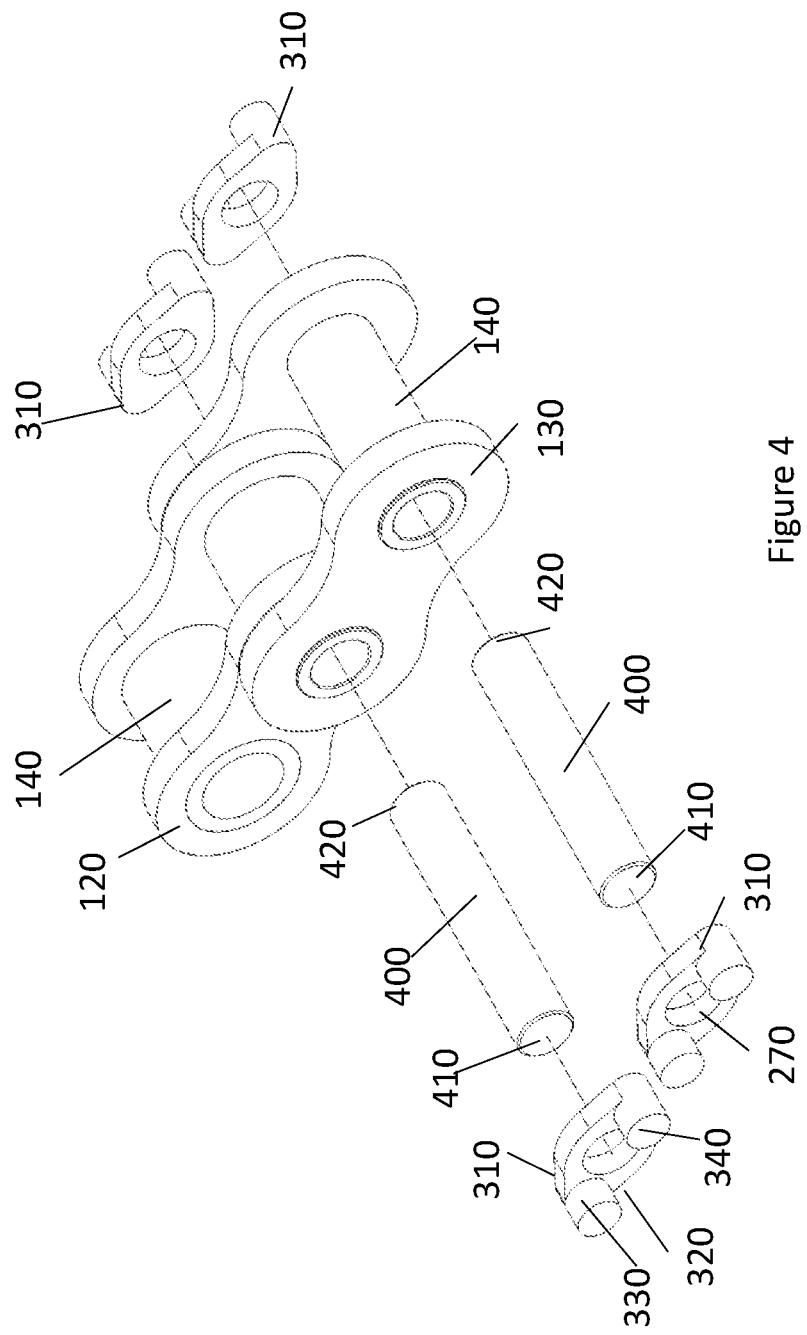
FIG. 4 is an exploded view of two engaging mechanisms forming part of the power transmission drive mechanism of FIG. 1, showing the connecting members of each engaging mechanism passing through the pins of the hollow pin chain of FIG. 1.

In this embodiment of the invention, the drive member comprises a hollow pin bush chain 110 comprising inner links 120 and outer links 130, the links 120, 130 being connected together by hollow pins 140 as shown particularly in FIGS. 2 and 3, for example.

Figure 5:
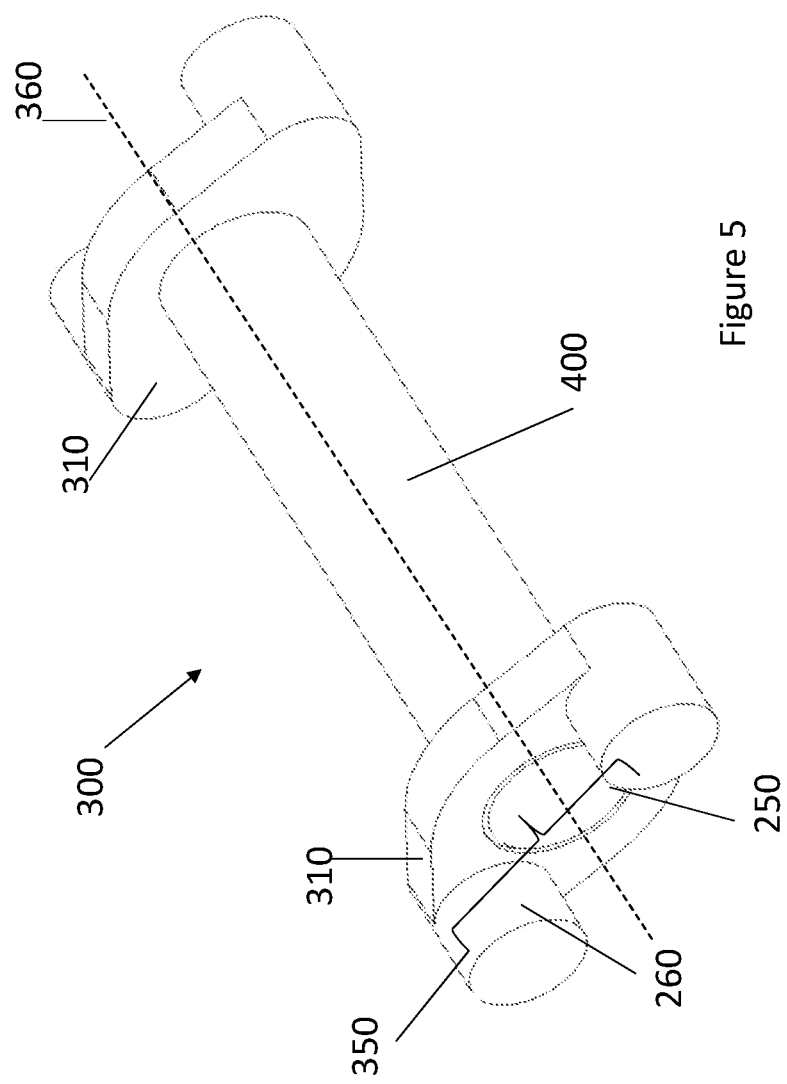
FIG. 5 is a schematic representation of an engaging mechanism forming part of the chain of FIG. 1.

The drive member 100 further comprises engaging mechanisms 300, as shown particularly in FIG. 5. In this embodiment of the invention each engaging mechanism comprises two engaging bodies 310. Each of the engaging bodies 310 comprises an engagement pocket 320 adapted to engage with the drive sprocket 200. Each engagement pocket comprises a first engaging surface 330 and a second engaging surface 340 spaced apart from the first engaging surface 330. Together the first and second engaging surfaces 330, 340 form an engaging surface pair 350 which is rotatable about an engaging mechanism rotational axis shown by the dotted line 360 in FIG. 5.

When the drive member 100 articulates with the sprocket 200, each tooth 240 of the drive sprocket 200 will engage with an engaging body 310 by contacting both the first engaging surface 330 and the second engaging surface 340 of the engaging body 310.

In other words the engaging mechanisms 300 are adapted to engage with each tooth 240 of the sprocket 200 using the principle of dual engagement, whereby contact is made on both sides of each tooth 240 to enable a secure engagement that is energetically efficient and able to distribute the load of the chain over a larger number of teeth of the sprocket 200.

The first and second engaging surfaces 330, 340 are configured such that when driven, a tooth 240 of the sprocket 200 meshes to the engagement pocket 320 of an engaging mechanism 300 at a first contact location 250 on the first engaging surface 330, and also at a second contact location 260 on the second engaging surface 340.

During use, the first contact location 250 is radially offset from the second contact location 260. This helps to prevent the engagement pockets 320 from becoming wedged or stuck on a tooth 240 during use.

In this embodiment of the invention, the first and second engaging surfaces 330, 340 are formed on first and second pins 280, 290 respectively.

The pins 280, 290 may be integrally formed with the remainder of the engagement body 310.

Figure 6:
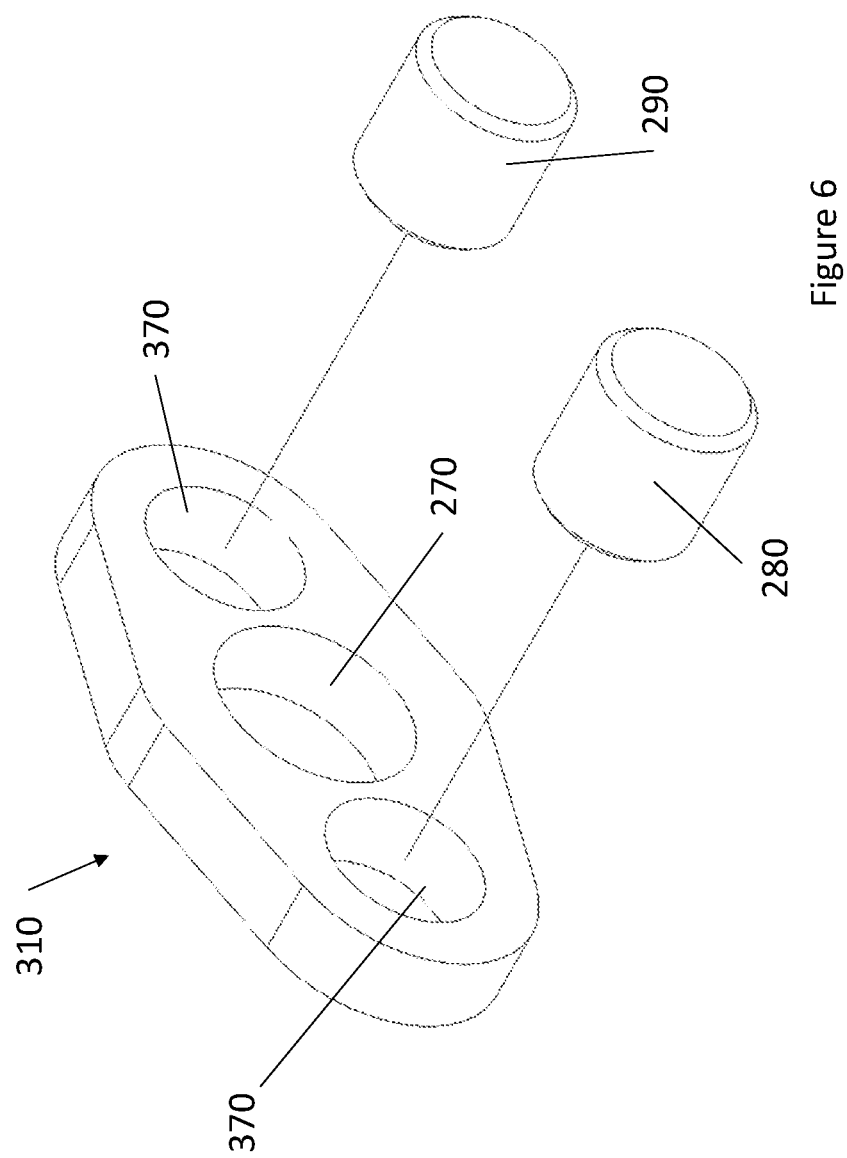
FIG. 6 is a schematic perspective view of an engaging body suitable for forming part of an engaging mechanism forming part of a drive transmission drive member according to embodiments of the invention.
Figure 7:
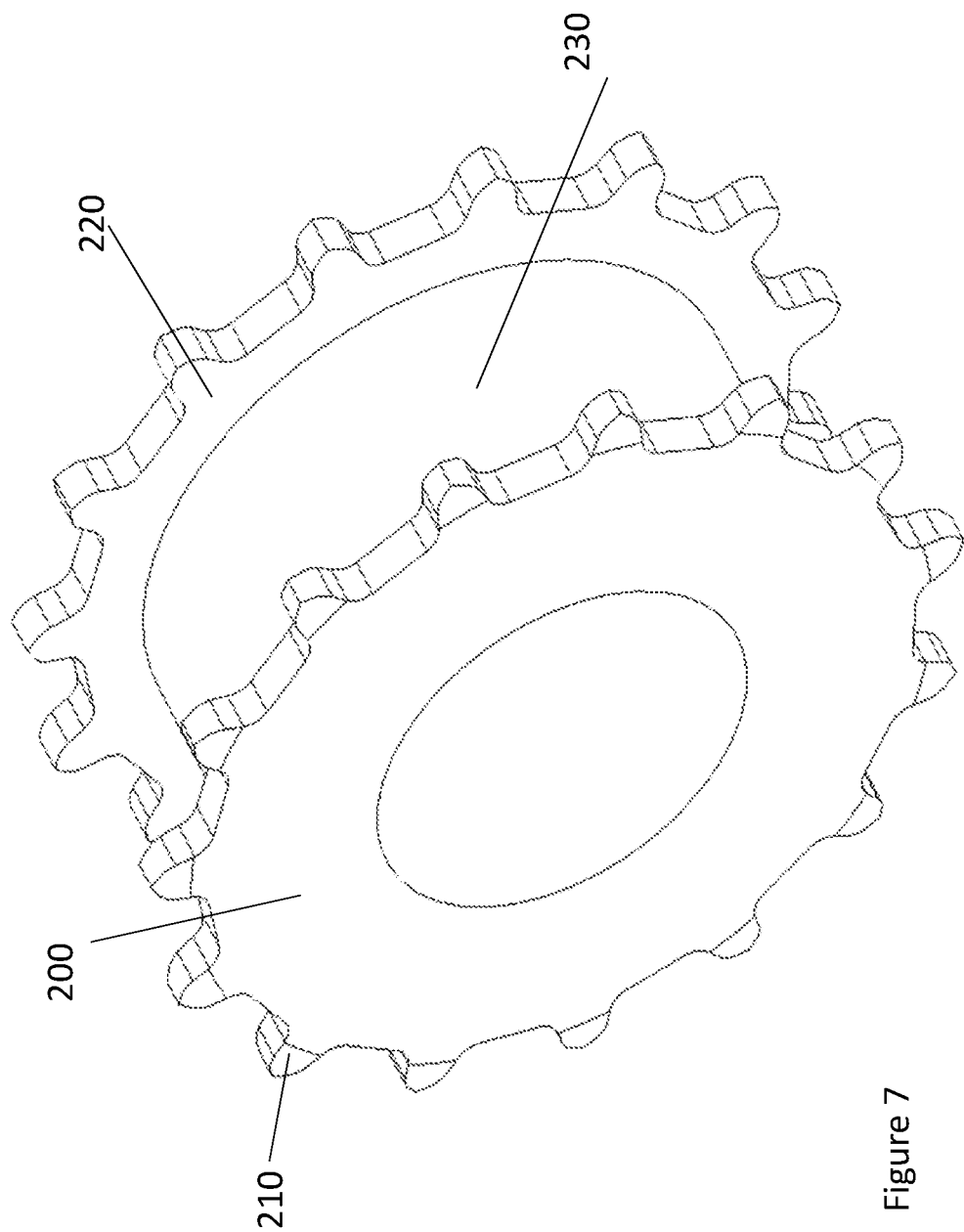
FIG. 7 is a schematic representation of a drive sprocket suitable for engaging with the drive member of FIG. 1.

In another embodiment of the invention, the pins 280, 290 may be formed separately from the remainder of the engagement body 310 as shown in FIG. 6. In this embodiment, the engaging body 310 comprises pin apertures 370 shaped such that the pins 280, 290 may be press fitted into the pin apertures 370.

In another embodiment of the invention, the pins 280, 290 have a semi-circular cross-section, with the engaging surfaces being formed on the curved portion of the pins 280, 290.

In another embodiment, the first and second engaging surfaces 330, 340 are formed from folded sheet material. Alternatively, the engaging body 310 is shaped to optimise engagement with a sprocket tooth 240.

Each of the engaging bodies 310 comprises an aperture 270, the centre of which is coaxial with the engaging mechanism rotational axis 360.

The engaging mechanisms 300 each further comprise a connecting member 400, having a first end 410 and a second end 420. The connecting member 400 is attachable to a first engaging body 310 at its first end 410 and to a second engaging body 310 at its second end 420, such that it extends coaxially with the rotational axis of the respective engaging mechanism.

In this embodiment of the invention, the first and second ends 410, 420 of the connecting member 400 each fit into an aperture 270 of an engaging body 310 such that both engaging bodies 310 of an engaging mechanism 300 rotate about the rotational axis 360 with the connecting member 400. In other words, the engaging bodies 310 are not able to rotate independently of the connecting member. The aperture 270 thus serves as a receiving portion adapted to receive the connecting member 400.

In some embodiments of the invention, the aperture 270 is profiled. This may aid orientation of the engaging body 310 relative to the connecting member 400.

In this embodiment of the invention, each connecting member 400 extends through a hollow pin 140, thereby connecting the engaging mechanisms 300 to the chain 110, such that a first engaging body 310 is on one side of the chain 110, and the other engaging body 310 is on the other side of the chain. Both of the engaging bodies 310 are thus external to the chain 110, with the engaging surfaces extending away from the chain, and the connecting member 400 extending transversely across the chain. In addition, both engaging bodies 310 rotate about the rotation axis 360.

By means of the invention, therefore, a standard hollow pin bush chain may be readily adapted so that it can engage with either two sprockets, or, as is the case in this embodiment, it can engage with a single sprocket 200 having two sets of teeth 210, 220, whereby the teeth 240 of the sprocket 200 mesh with engagement pockets 320 positioned externally to the chain.

Figure 8:
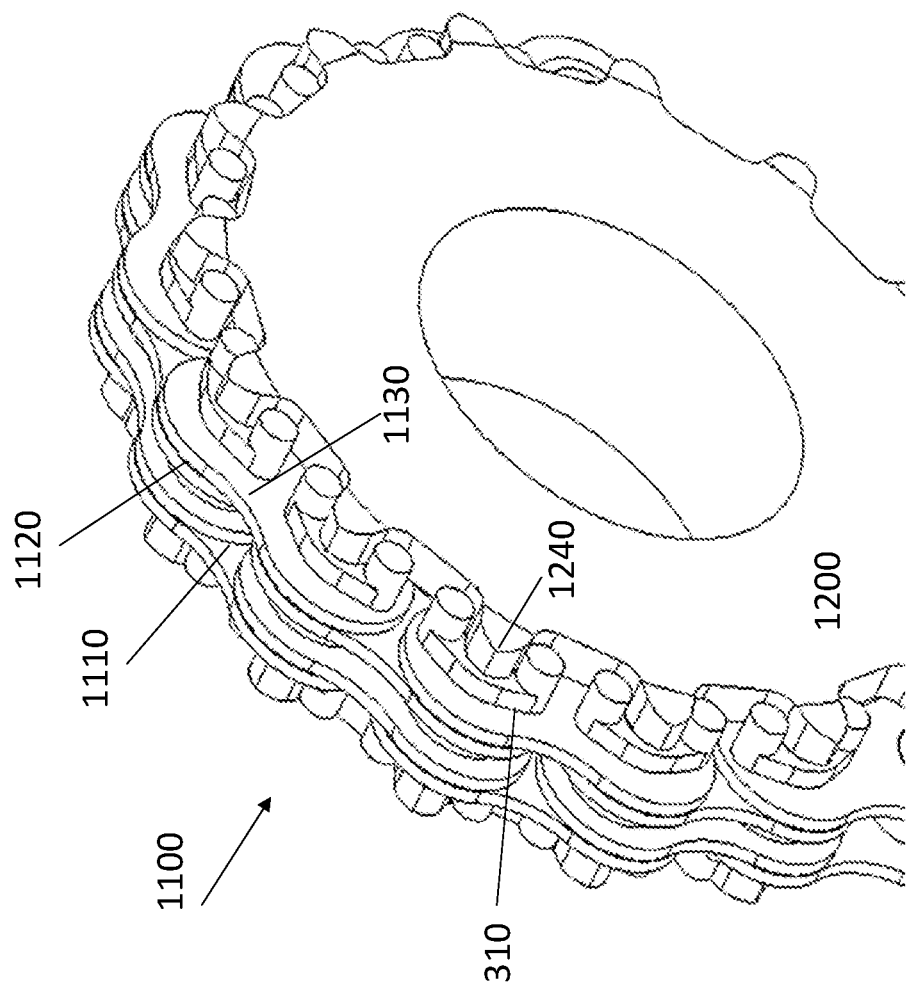
FIG. 8 is a schematic representation of an embodiment of a power transmission member with a thinner width than that of the power transmission drive member of FIG. 1, articulated around a drive sprocket also having a thinner width than that of the sprocket of FIG. 7.
Figure 9:
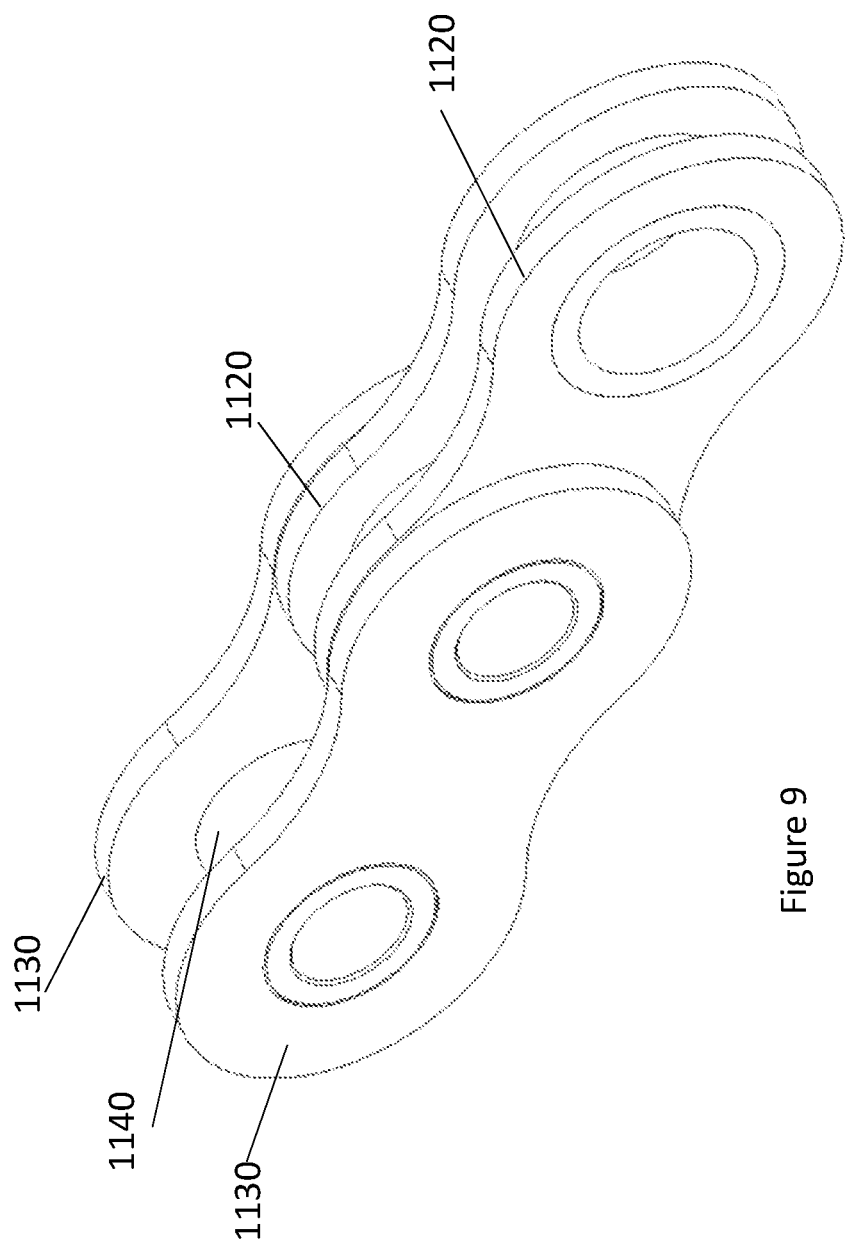
FIG. 9 is a schematic representation of a portion of the chain of FIG. 8.
Figure 10:
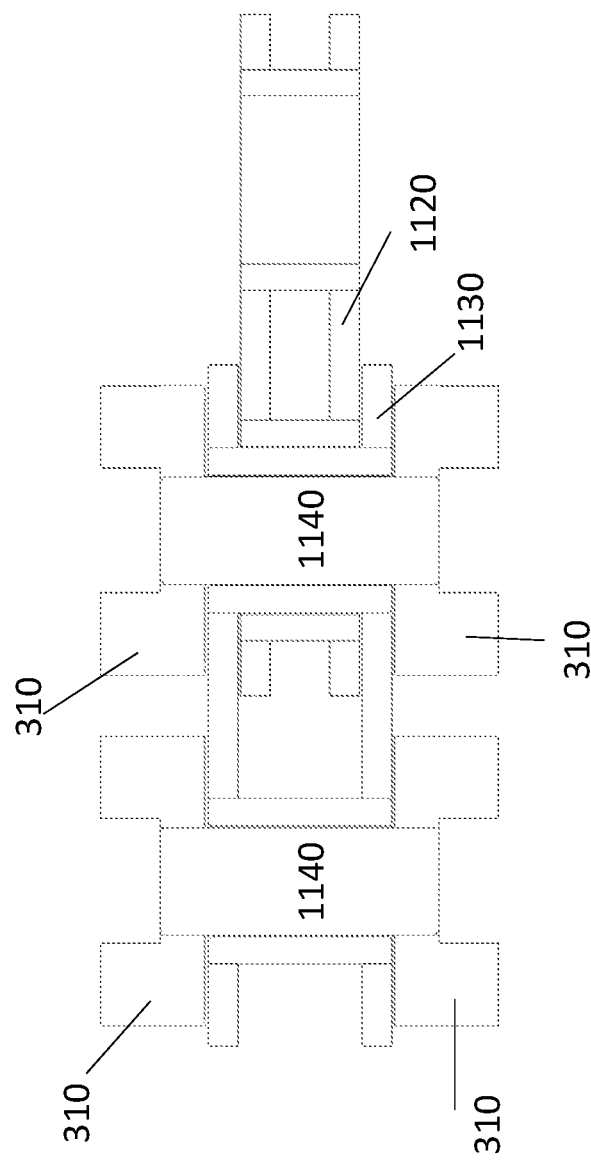
FIG. 10 is a sectional view of a portion of the chain shown in FIG. 9 showing the engaging mechanisms in place.

Referring now to FIGS. 8 to 10, a power transmission drive member 1100 according to another embodiment of the invention is shown articulating around a drive sprocket 1200, having teeth 1240.

In this embodiment of the invention, the power transmission drive member 1100 comprises a hollow pin chain 1110 which is narrower than a conventional hollow pin chain of the type shown in FIG. 1 for example. The chain 1110 comprises inner links 1120, and outer links 1130 which are similar to the links 110 and 120 of the chain 110 of FIG. 1, except that the width of the chain 1110 no longer has to be wide enough to accommodate sprocket teeth. This is because the teeth 1240 of sprocket 1200 engage externally of the chain 1110 in the same way as described herein above with respect to the embodiment illustrated in FIGS. 1 to 7.

Because the width of the chain 1110 is narrower than that of chain 110, the space between the two sets of teeth of sprocket 1200 is correspondingly narrower than the space between the two sets of teeth of sprocket 200.

Figure 11:
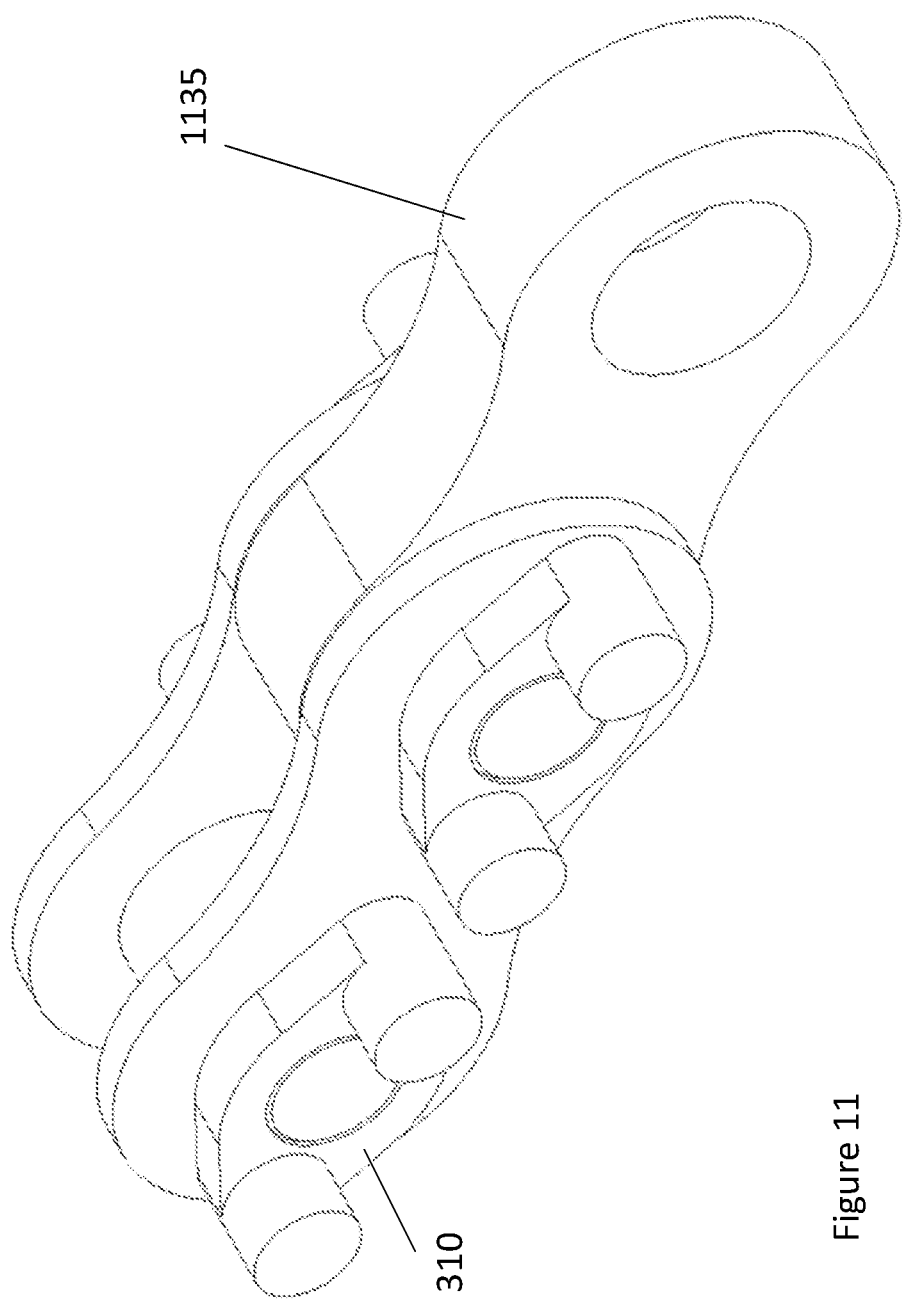
FIG. 11 is a schematic representation of a portion of a chain according to another embodiment of the invention showing engagement bodies connected to the links of the chain.
Figure 12:
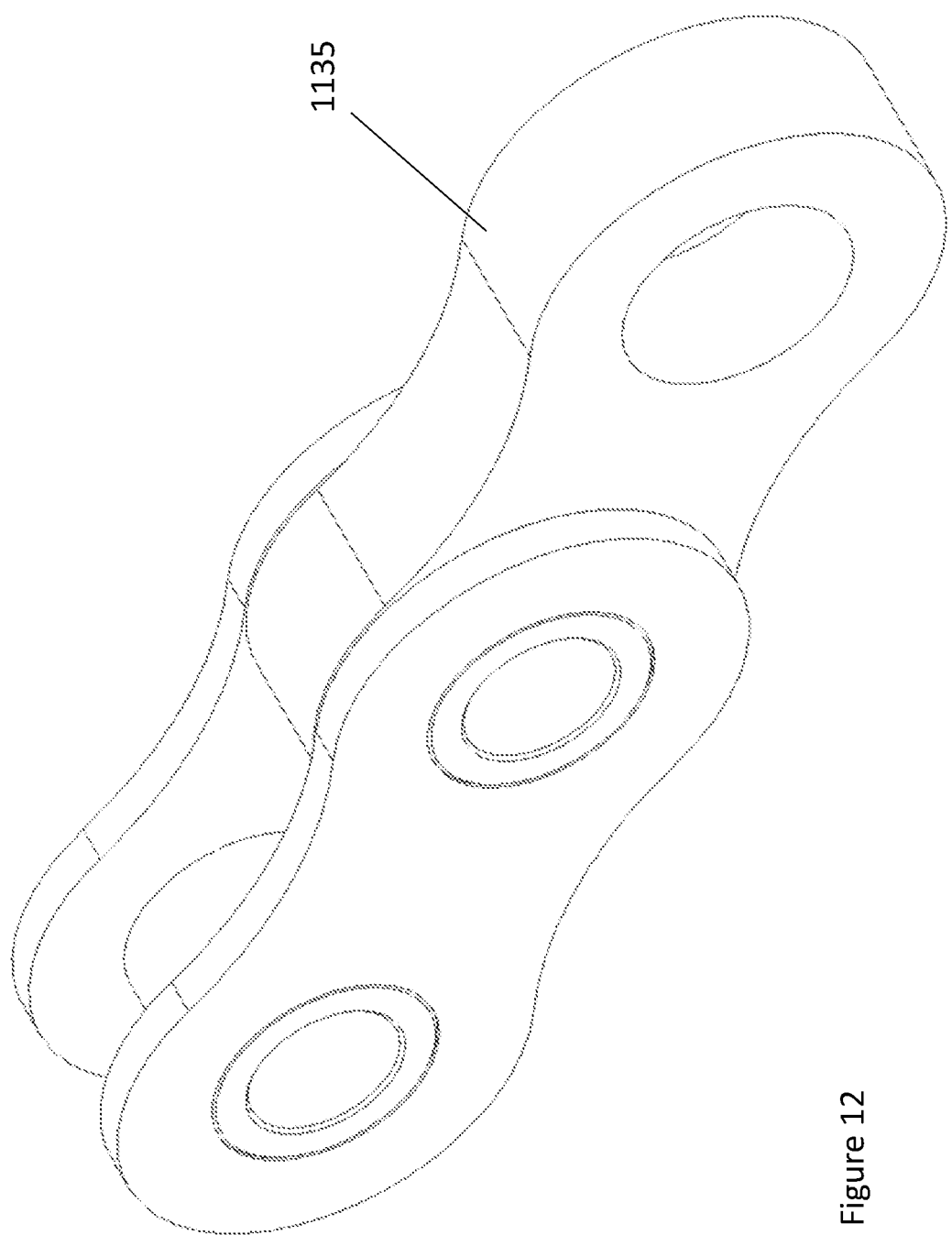
FIG. 12 is a schematic representation of the links of FIG. 11 without the engagement bodies.

In an alternative embodiment illustrated in FIGS. 11 and 12, the inner links 1120 are replaced by a single plate 1135, which plate comprises first and second hollow pin receiving portions adapted to receive a hollow pin in a similar manner to the previous embodiments described above.

In all other respects, the power transmission drive member 1100 contains corresponding parts and operates in the same way as power transmission drive member 100.

Figure 13:
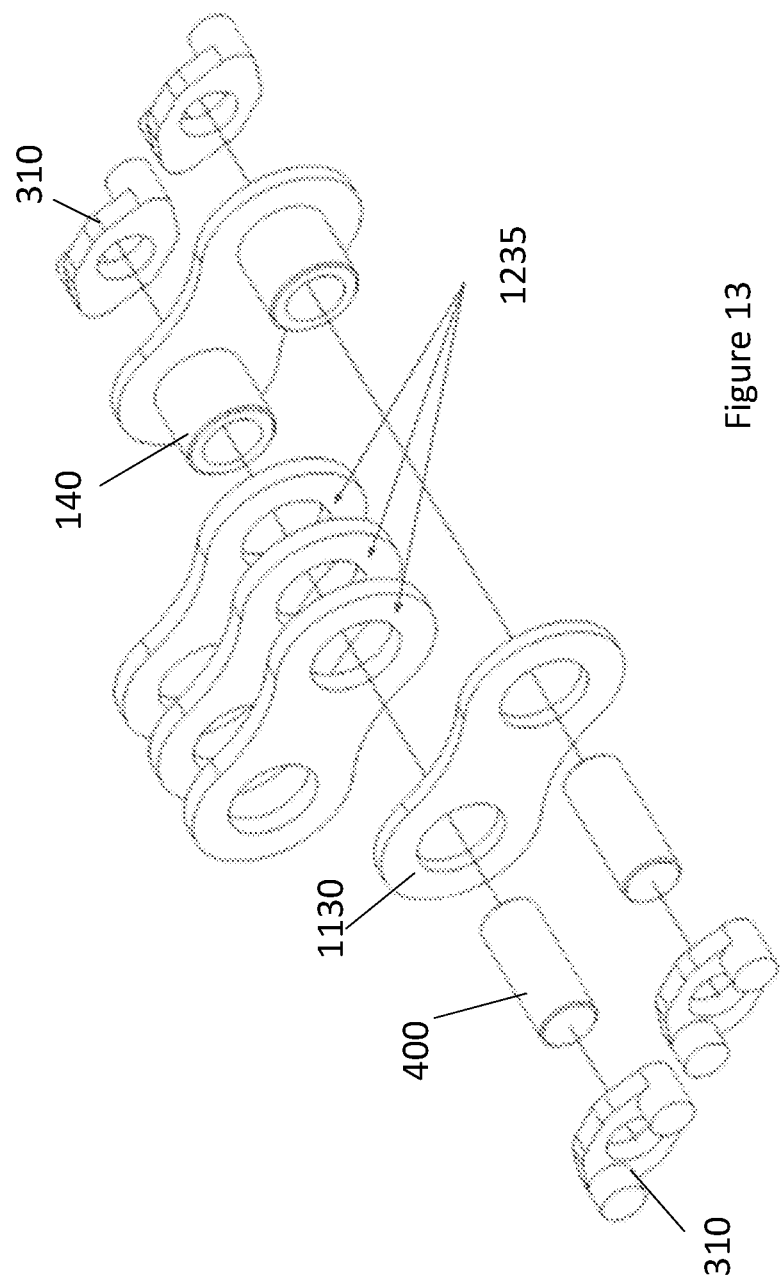
FIG. 13 is an exploded schematic representation of a part of a chain according to another embodiment of the invention in which the inner links are formed from a plurality of link plates.

Turning now to FIG. 13 a further embodiment of the invention is shown. In this embodiment, the inner link 1135 has been replaced by a plurality of thinner link plates 1235 forming a composite inner link. This can be advantageous from a manufacturing point of view, and also means that by having a plurality of link plates 1235, the thickness of the composite link can be varied according to suit the application.

Figure 14:
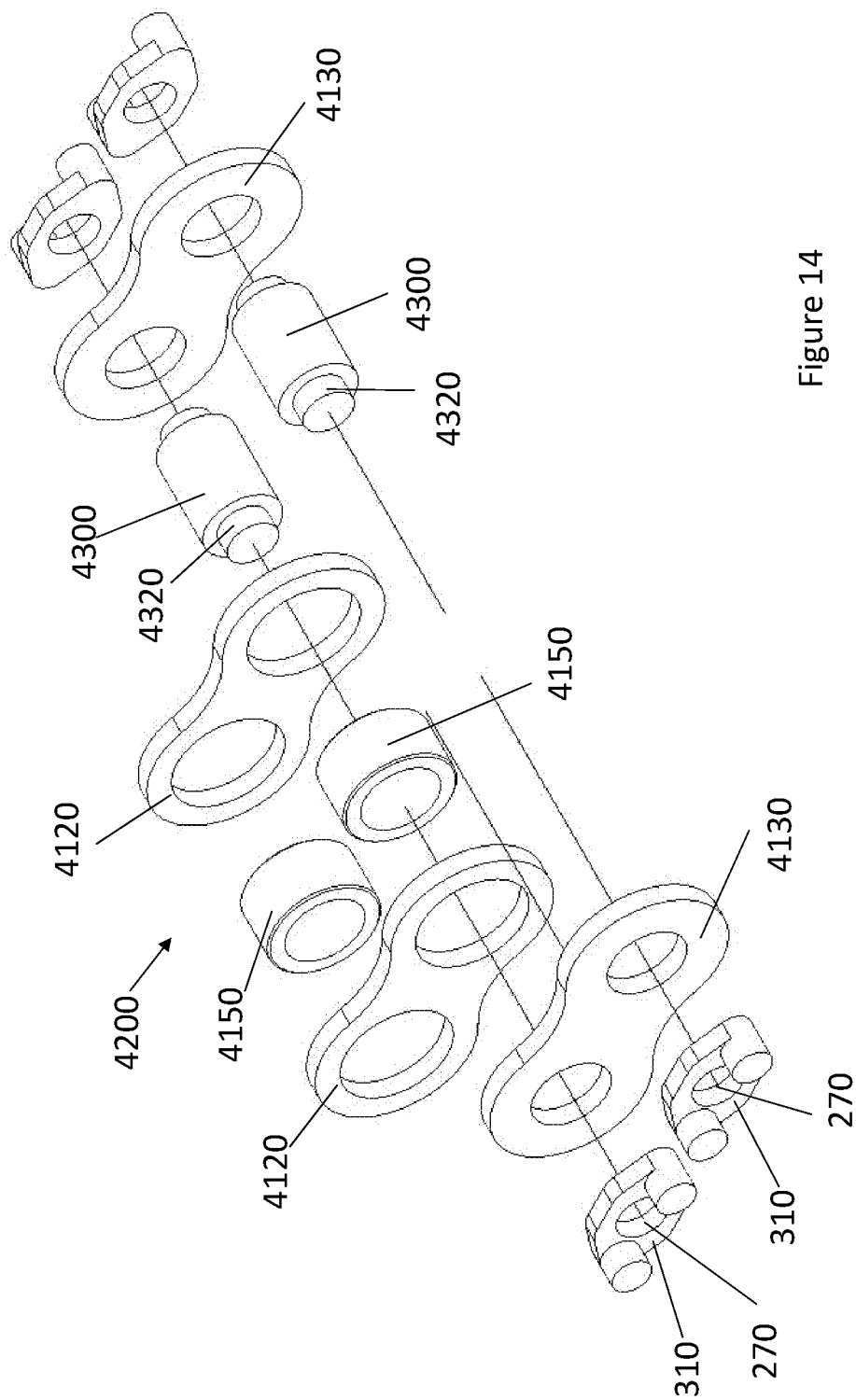
FIG. 14 is an exploded schematic representation of part of a chain according to another embodiment of the invention in which the chain is a bush chain with solid pins.
Figure 15:
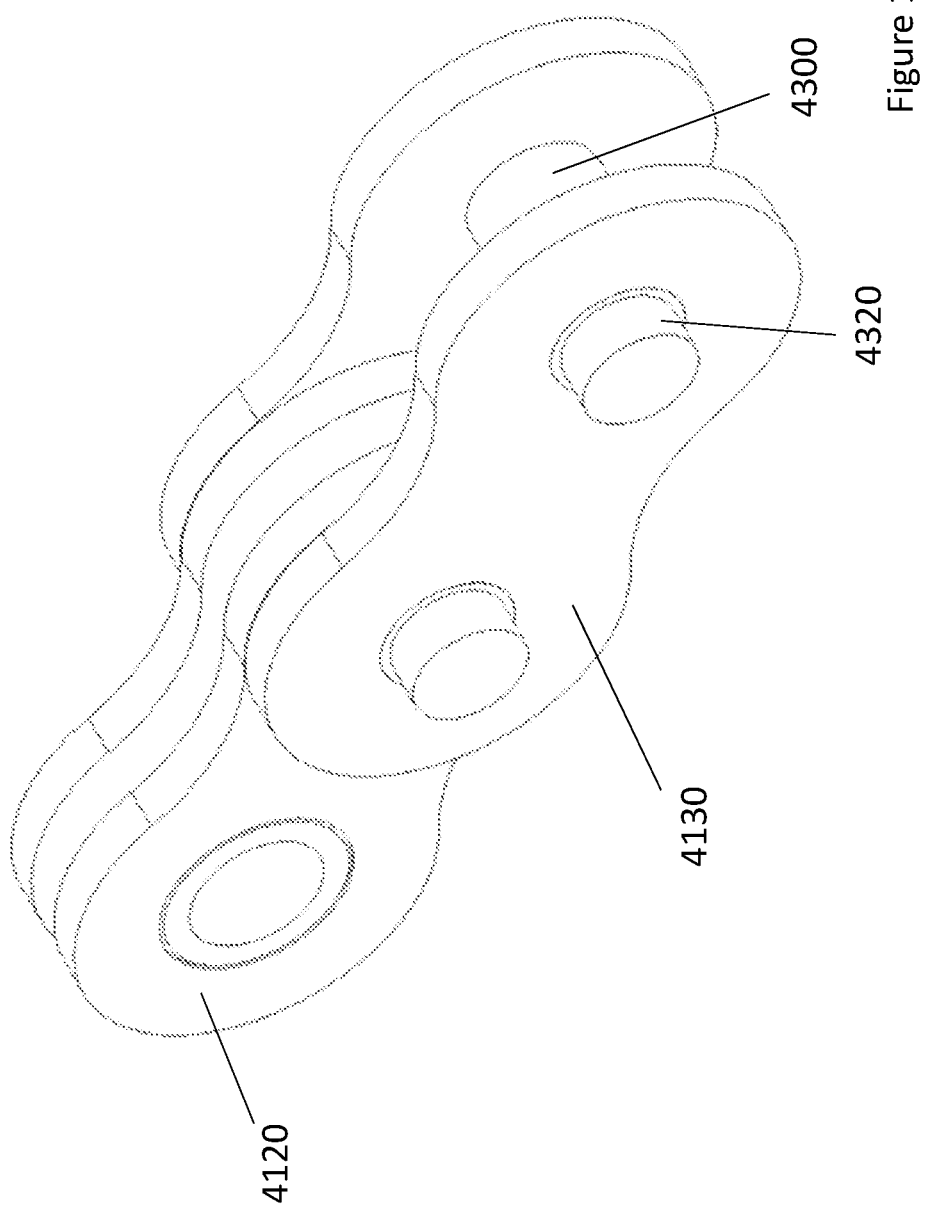
FIG. 15 is a schematic perspective view of a part of the chain shown in FIG. 14 without the engaging bodies in place.
Figure 16:
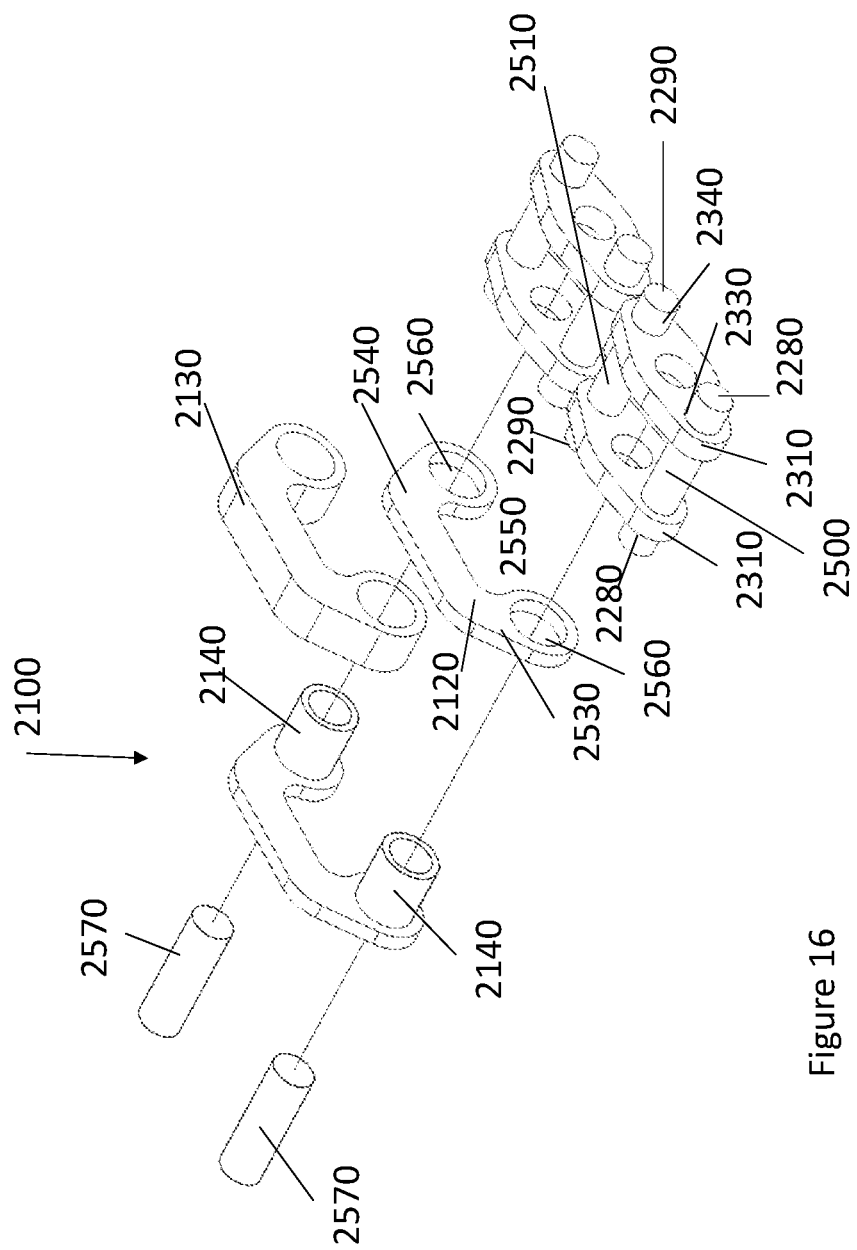
FIG. 16 is an exploded schematic representation of a portion of a chain forming a power transmission drive member according to another embodiment of the invention.

Turning now to FIGS. 14 and 15, another embodiment of a power transmission drive chain according to an embodiment of the invention is shown.

In this embodiment of the invention, the power transmission drive member comprises a bush chain 4200 comprising solid pins 4300 which extend across the width of the chain 4200.

Each of the pins 4300 has a pin extension 4320 at either end of each pin 4300. Each of the pins 4300 passes through apertures in the outer link plates 4130 and the inner link plates 4120 as well as bushes 4150. The pins are sized and shaped so that there is an interference fit between each pin and a respective outer link plate 4130. Each pin extends between respective engaging bodies 310, and each pin extension 4320 is adapted to pass through the aperture 270 of each engaging body 310. Each pin extension is sized and shaped such that there is a clearance fit between each pin extension 4320 and a respective engaging body 310.

In such embodiments of the invention each engaging body 310 is able to rotate independently about a respective pin extension 4320.

Each pin 4300 may have a head formed at each end thereof in order to prevent each engaging body 310 from becoming detached from a respective pin 4300.

Referring now to FIGS. 16 to 19 part of a power transmission drive member 2100 according to another embodiment of the invention is shown.

In this embodiment, each engaging mechanism 2300 comprises two engaging bodies 2310 which are spaced apart from one another. Each engaging mechanism further comprises first and second extension members 2500, 2510, which extend through each engaging body and serve to connect two engaging bodies 2310 to one another.

Each extension member 2500, 2510 extends through the engaging bodies 2310 to form pins 2280, 2290 on which the first and second engaging surfaces 2330, 2340 are formed.

The first and second engaging surfaces of both engaging bodies 2310 are thus integrally formed.

Figure 17:
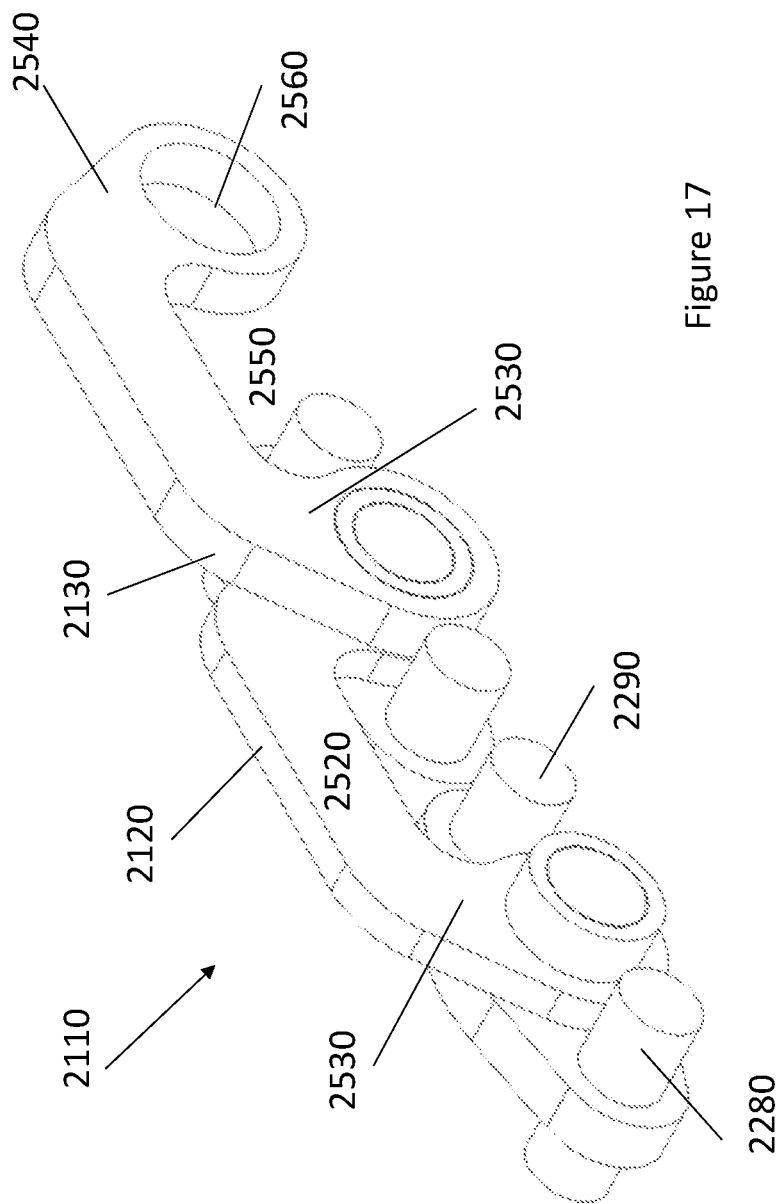
FIG. 17 is an exploded schematic representation of the portion of the chain of FIG. 16 showing hollow pins extending through the chain.
Figure 18:
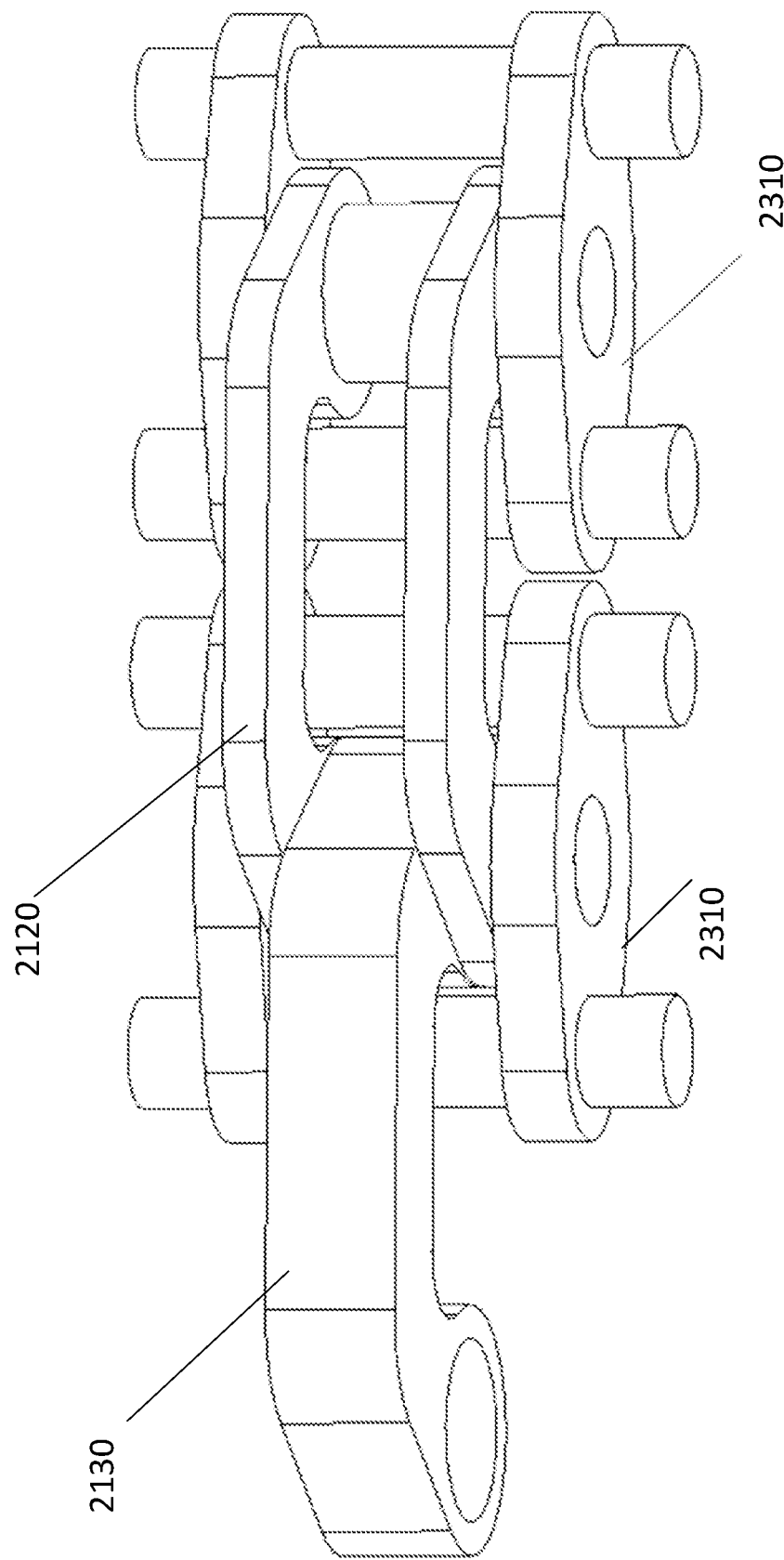
FIG. 18 is a perspective view from above of the portion of the chain of FIG. 16.
Figure 19:
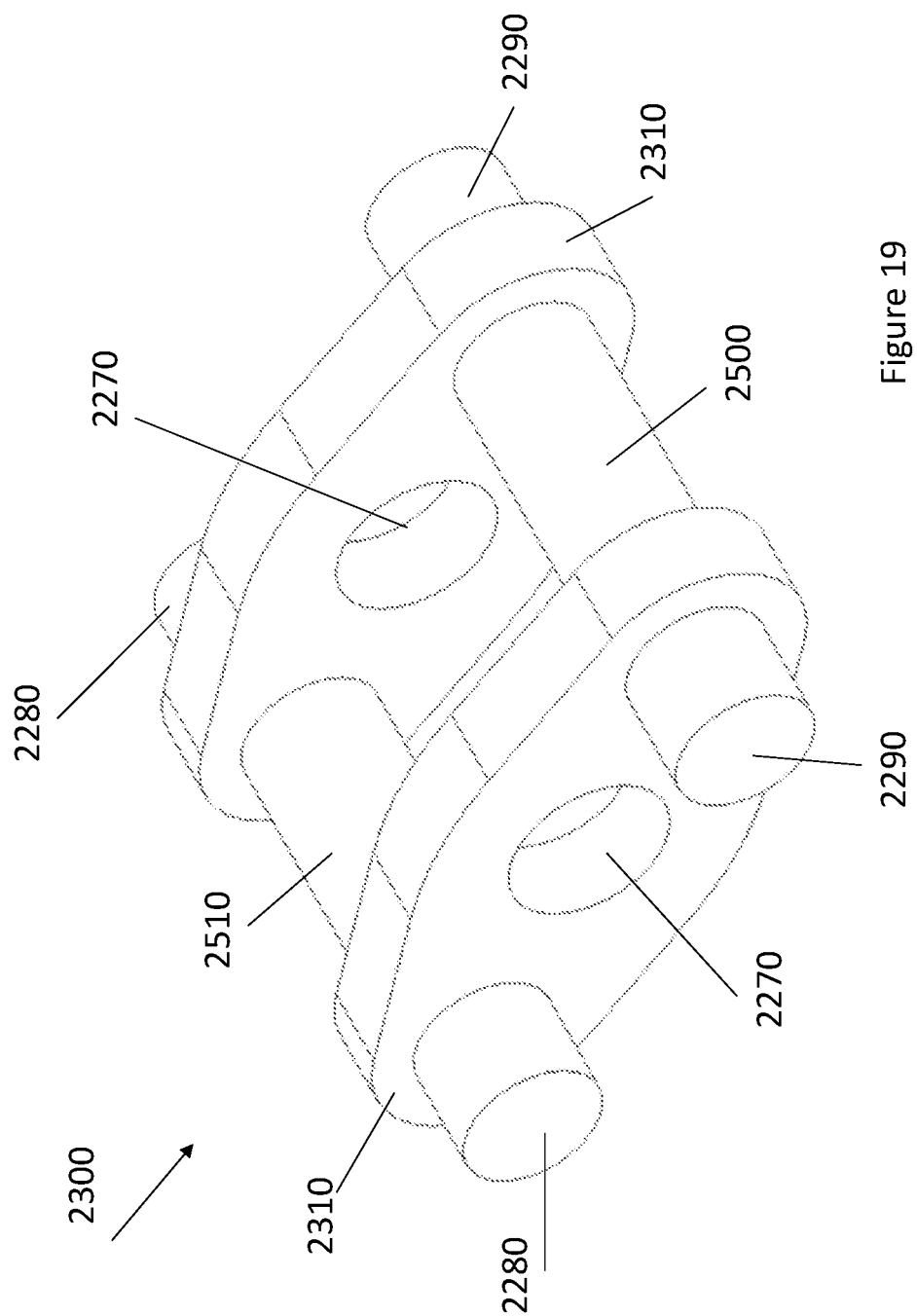
FIG. 19 is a perspective view from above of the portion of the chain of FIG. 16 having engaging surfaces formed from single bodies extending across the width of a chain.

The drive member 2100 comprises a chain 2110, part of which is shown particularly in FIG. 17. The chain comprises outer links 2120, and inner links 2130 connected together by a hollow pin 2140.

Each link 2120, 2130 comprises a body portion 2520, and first and second legs 2530, 2540 integrally formed with the body portion 2520, and extend from the body portion 2520 to define a space 2550 between the legs 2530, 2540 and the body portion 2520. Each leg 2530, 2540 comprises a hollow pin receiving portion 2560, and each link 2120, 2130 is positionable on the engaging bodies 2310 such that the hollow pin receiving portion 2560 of a first leg 2530 of a link is coaxial with the rotational axis of a first engaging mechanism, and the hollow pin receiving portion 2560 of the second leg of the link is coaxial with the rotational axis of a second, adjacent engaging mechanism. This means that the hollow pin receiving portions 2560 are coaxial with the apertures 2270 of the engaging bodies 2310.

Each engaging mechanism 2300 further comprises a central pin 2570 which passes through a respective hollow pin 2140.

Each hollow pin 2140 fits through the hollow pin receiving portion 2560 of a respective inner link 2130. The central pin 2570 extends through the hollow pin 2140 and the respective apertures 2270 of both engaging bodies 2310, with the engaging bodies 2310 positioned on either side of the outer link 2120.

This arrangement enables the engaging mechanisms to rotate about their respective rotational axes. The space 2550 provides space for the rotation.

The engaging mechanism 2300 and the engaging bodies 2310 are equivalent to the engaging mechanism 300 and the engaging bodies 310 and function in the same way. In particular, the first and second engaging surfaces 2330, 2340 form an engagement pocket 2320 which is equivalent to engagement pocket 320 and therefore results in dual engagement of the tooth of a sprocket in the pitch pocket as described with reference to the previous embodiment.

Figure 20:
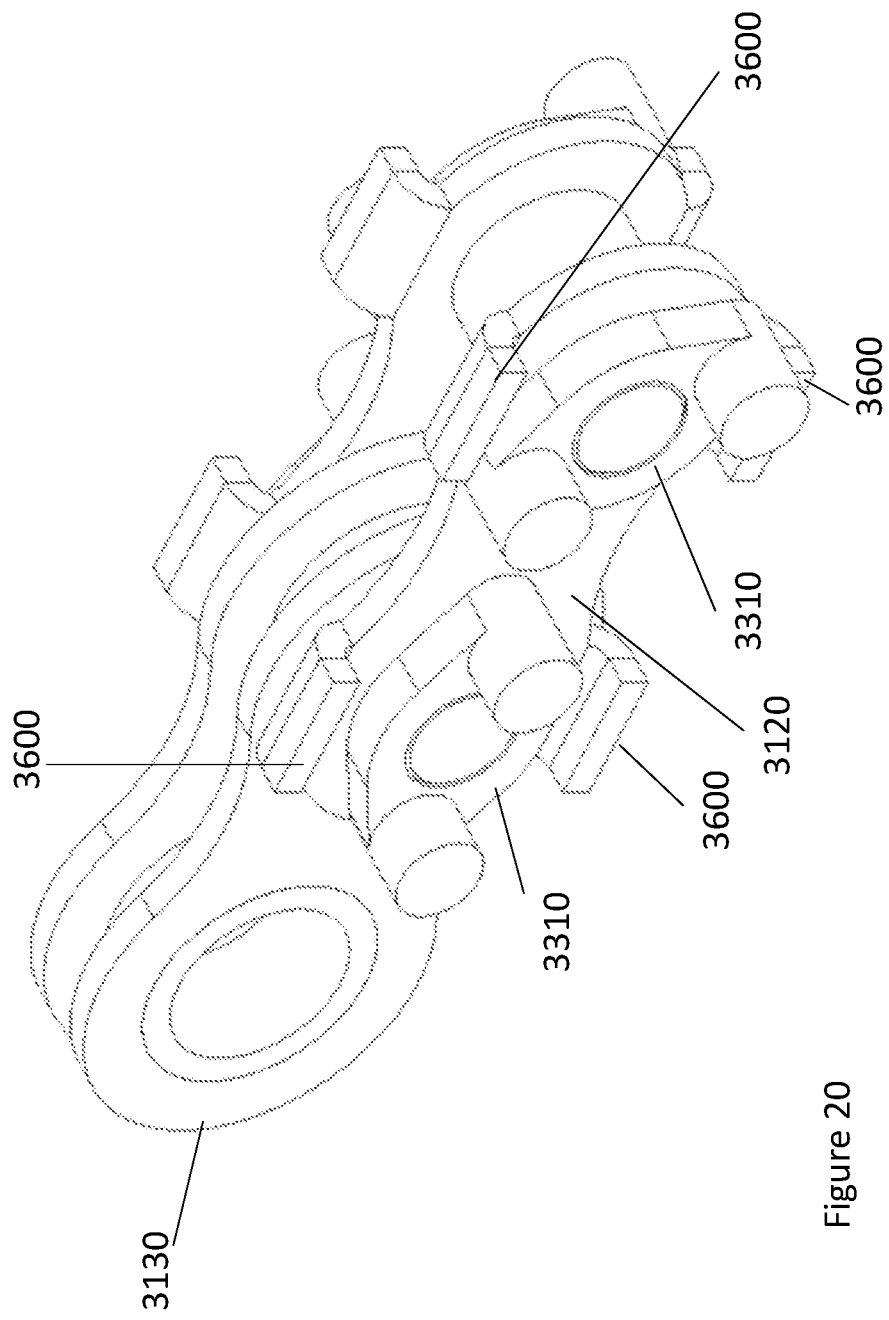
FIG. 20 is a schematic representation of an outer link plate with angle limiters formed thereon.

Turning now to FIG. 20 a further embodiment of an outer link plate 3120 is shown including angle of rotation limiters. These limiters are designed to prevent over rotation of the engaging bodies during use.

In the embodiment shown in FIG. 20, the outer link plate 3120 comprises limiters 3600 formed from bent sections of the outer link plate 3120. The angle limiters 3600 limit the rotational movement of the engaging bodies 3310 and thus reduce the likelihood that the engaging bodies will become stuck.

By means of the present invention, and as described above, each tooth of a drive sprocket will engage with an engaging body by contacting both a first engaging surface and a second engaging surface. This dual engagement reduces the stress on the sprocket as well as relative movement between the chain and sprocket during use thereby reducing wear and tear on the drive member as well as the drive sprocket. In addition, frictional losses are reduced, thereby increasing transmission efficiency.

What is claimed is:

1. A power transmission drive member adapted to mesh with a drive sprocket to transmit rotary motion, the drive member comprising a plurality of engaging mechanisms, each comprising an engaging body comprising an engagement pocket adapted to engage with the drive sprocket, each of which engagement pockets comprising a first engaging surface and a second engaging surface spaced apart from the first engaging surface, the first and second engaging surfaces forming an engaging surface pair, which pair is rotatable about an engaging mechanism rotational axis, wherein the power transmission drive member comprises a carrier, which carrier is articulated and is adapted to support the plurality of engaging mechanisms, wherein the first and second engaging surfaces are positioned symmetrically relative to the rotational axis of a respective engaging body.

2. A power transmission drive member as claimed in claim 1, wherein the engaging surfaces are configured such that when driven, a tooth of the sprocket meshes to the engagement pocket at a first contact location on the first engaging surface, and also at a second contact location on the second engaging surface.

3. A power transmission drive member as claimed in claim 2, wherein the first contact location is radially offset from the second contact location during use.

4. A power transmission drive member as claimed in claim 1, wherein the first and second engaging surfaces of each engaging body are formed on first and second pins respectively.

5. A power transmission drive member as claimed in claim 1, wherein each engaging mechanism comprises two engaging bodies, which engaging bodies are spaced apart from one another.

6. A power transmission drive member adapted to mesh with a drive sprocket to transmit rotary motion, the drive member comprising a plurality of engaging mechanisms, each comprising an engaging body comprising an engagement pocket adapted to engage with the drive sprocket, each of which engagement pockets comprising a first engaging surface and a second engaging surface spaced apart from the first engaging surface, the first and second engaging surfaces forming an engaging surface pair, which pair is rotatable about an engaging mechanism rotational axis, wherein the power transmission drive member comprises a carrier, which carrier is articulated and is adapted to support the plurality of engaging mechanisms, wherein each engaging mechanism comprises a connecting member having a first end and an opposite second end, and attachable to one engaging body at the first end, to the other engaging body at the second end, and extending colinearly with the rotational axis of the respective engaging mechanism wherein each engaging body of a respective engaging mechanism comprises a front face and an opposite back face, wherein the engaging surfaces of each engaging body extend from the front face of a respective engaging body, and the connecting member extends from the back face of one engaging body to the back face of the other engaging body, which connecting member is adapted to enable connection of a respective engaging mechanism to the carrier.

7. A power transmission drive member as claimed in claim 6, wherein the connecting member is attached to each engaging body by means of a press fit with the engaging body.

8. A power transmission drive member as claimed in claim 6, wherein each engaging body comprises a receiving portion adapted to receive the connecting member, which receiving portion comprises an aperture, the centre of which is coaxial with the rotational axis of a respective engaging mechanism.

9. A power transmission drive member as claimed in claim 6 wherein the carrier comprises hollow pins extending transversely at least partially across the carrier at spaced apart intervals along the length of the carrier, wherein each connecting member extends through a hollow pin to thereby connect the engaging mechanisms to the carrier.

10. A power transmission drive member as claimed in claim 6, wherein the carrier comprises a chain formed from links, wherein each link comprises a body portion and first and second legs extending from the body portion to define a space between the legs and the body portion, wherein each leg comprises a hollow pin receiving portion, wherein the hollow pin receiving portion of a first leg of a link is coaxial with the rotational axis of a first engaging mechanism, and the hollow pin receiving portion of the second leg of the link is coaxial with the rotational axis of a second, adjacent, engaging mechanism, and wherein each connecting member is adapted to extend through a respective hollow pin and engaging body, to thereby link the engaging bodies to the links, such that each engaging body is rotatable about its rotational axis, the space of each link providing space for such rotation.

11. A power transmission drive member as claimed in claim 1, comprising a chain having inner links and outer links, wherein the inner links of the chain each comprise a composite inner link formed from a plurality of link plates.

12. A power transmission drive member as claimed in claim 1, wherein each engaging mechanism comprises first and second extension members, which extension members are spaced apart from, and coaxial with one another, and each has first and second end portions, wherein the extension member extends across the width of the engaging mechanism and through each engaging body such that the first and second end portions of each extension member extend from the first face of each engaging body, away from the carrier to form a pin, wherein the first engaging surfaces of each engaging body are formed on the first and second end portions respectively of the first extension member, and the second engaging surfaces of each engaging body are formed on the first and second end portions respectively of the second extension member.

13. A power transmission drive member as claimed in claim 1, wherein the carrier comprises angle rotation limiters providing stops formed on the carrier.

14. An engaging mechanism for a power transmission drive member, the drive member adapted to mesh with a drive sprocket to transmit rotary motion, the engagement mechanism comprising an engaging body comprising an engagement pocket adapted to engage with the drive sprocket, the engagement pocket comprising a first engaging surface and a second engaging surface spaced apart from the first engaging surface, the first and second engaging surface forming an engaging surface pair, which pair is rotatable about an engaging mechanism rotational axis, wherein the first and second engaging surfaces are positioned symmetrically relative to the rotational axis of a respective engaging body.

* * * * *